United States Patent [19]
Brown

[11] 3,817,611
[45] June 18, 1974

[54] RUN-OUT AND SAFETY SWITCH MECHANISM FOR MOTION PICTURE PROJECTORS

[75] Inventor: Ilo M. Brown, Omaha, Nebr.

[73] Assignee: Ballantyne of Omaha, Inc., Omaha, Nebr.

[22] Filed: Mar. 9, 1973

[21] Appl. No.: 339,546

[52] U.S. Cl................ 352/155, 200/61.13, 340/260
[51] Int. Cl. .......................................... G03b 21/18
[58] Field of Search .......... 352/92, 155; 200/61.13, 200/61.14; 340/260, 259

[56] References Cited
UNITED STATES PATENTS
| | | | |
|---|---|---|---|
| 1,120,577 | 12/1914 | Wiese | 352/92 X |
| 1,243,067 | 10/1917 | Hulsey et al. | 340/260 |
| 2,269,952 | 1/1942 | Morgan | 352/92 |

FOREIGN PATENTS OR APPLICATIONS
| | | | |
|---|---|---|---|
| 884,732 | 7/1953 | Germany | 352/92 |

*Primary Examiner*—Monroe H. Hayes
*Attorney, Agent, or Firm*—Molinare, Allegretti, Newitt & Witcoff

[57] ABSTRACT

A run-out and safety switch mechanism positioned between the lower sprocket and the take-up reel of a motion picture projector including two, spaced-apart sensing arms held by spring tension in sliding engagement with the opposing edges of the film strip. A limit switch positioned between the two sensing arms is actuated whenever the absence of any portion of the film strip being transported permits the spacing between the two sensing arms to decrease below a predetermined limit. The body of the limit switch is mounted on the inside of one of the two sensing arms and is actuated by the approach of the other sensing arm. Retaining buttons at the extremity of each sensing arm hold the film strip in a captured position even during start-up when excessive loop lengths may form between the lower sprocket and the take-up reel.

3 Claims, 5 Drawing Figures

RUN-OUT AND SAFETY SWITCH MECHANISM FOR MOTION PICTURE PROJECTORS

BACKGROUND OF THE INVENTION

This invention relates to tape and filmstrip transport mechanisms, and more particularly, but in its broader aspects not exclusively, to a run-down and safety switch mechanism for use in a motion picture projector.

It is desirable to include, within a motion picture projection system, safety switches capable of shutting down the filmstrip transport mechanism in response to detected malfunctions, thereby preventing extensive damage to the filmstrip. The need for effective filmstrip protection devices is even more critical in automated projection systems of the type left unattended for substantial periods of time.

Prior to the present invention, switching devices have been employed for shutting down the projector when the filmstrip being projected breaks. These systems have included tension roller mechanisms which are normally held in an operating position by the filmstrip but which, when the filmstrip breaks, are allowed to travel to a released position, shutting down the projector. In another known arrangement, a single sensing arm is held by spring tension in sliding engagement with one edge of the filmstrip. Should the filmstrip break, permitting further travel of the arm, the projector is shut down.

While both of these arrangements have proven effective when the filmstrip breaks completely, neither is uniformly capable of detecting film splitting. Because the commercial 35 mm. filmstrip is provided with sprocket holes along both of its edges, half of a filmstrip that splits lengthwise may continue to be transported through the transport mechanism sprockets, the unbroken half holding the conventional tension roller or a sensing arm switch in its normal, operating position. The resulting destruction of a substantial length of the filmstrip may require that the entire reel be replaced, since a spliced repair is no longer possible.

It is accordingly a principal object of the present invention to provide an improved filmstrip protection mechanism which is capable of sensing a film splitting condition, even when complete breakage of the filmstrip has not occurred.

In a principal aspect, the present invention takes the form of a protection switching device which is used in conjunction with a motor-driven sprocket and guide means for advancing a tape or filmstrip through a detection station. First and second spaced-apart sensing arms are positioned at this detecting station, the two arms being pulled toward one another by spring tension. In operation, however, the two arms are in sliding engagement with opposing edges of the filmstrip, which holds them apart. Electrical switching means responsive to the relative motion of the two arms is employed to deenergize the transport mechanism whenever the absence of any portion of the filmstrip allows the spacing between the two arms to decrease below a predetermined limit.

In a preferred protection switch mechanism making use of the principles of the present invention, the two sensing arms are each mounted for pivotal motion about first and second axes respectively, the two axes being spaced apart by distance approximately equal to the width of the filmstrip. The body of a limit switch is mounted on the inside of one of the two swing arms in position to engage with a projection from the opposing arm when the two arms are allowed to pivot toward one another.

BRIEF DESCRIPTION OF THE DRAWINGS

These and other objects, features and advantages of the present invention will become more apparent through a consideration of the following detailed description taken in conjunction with the attached drawings in which.

DESCRIPTION OF THE PREFERRED EMBODIMENT

Figure 1:
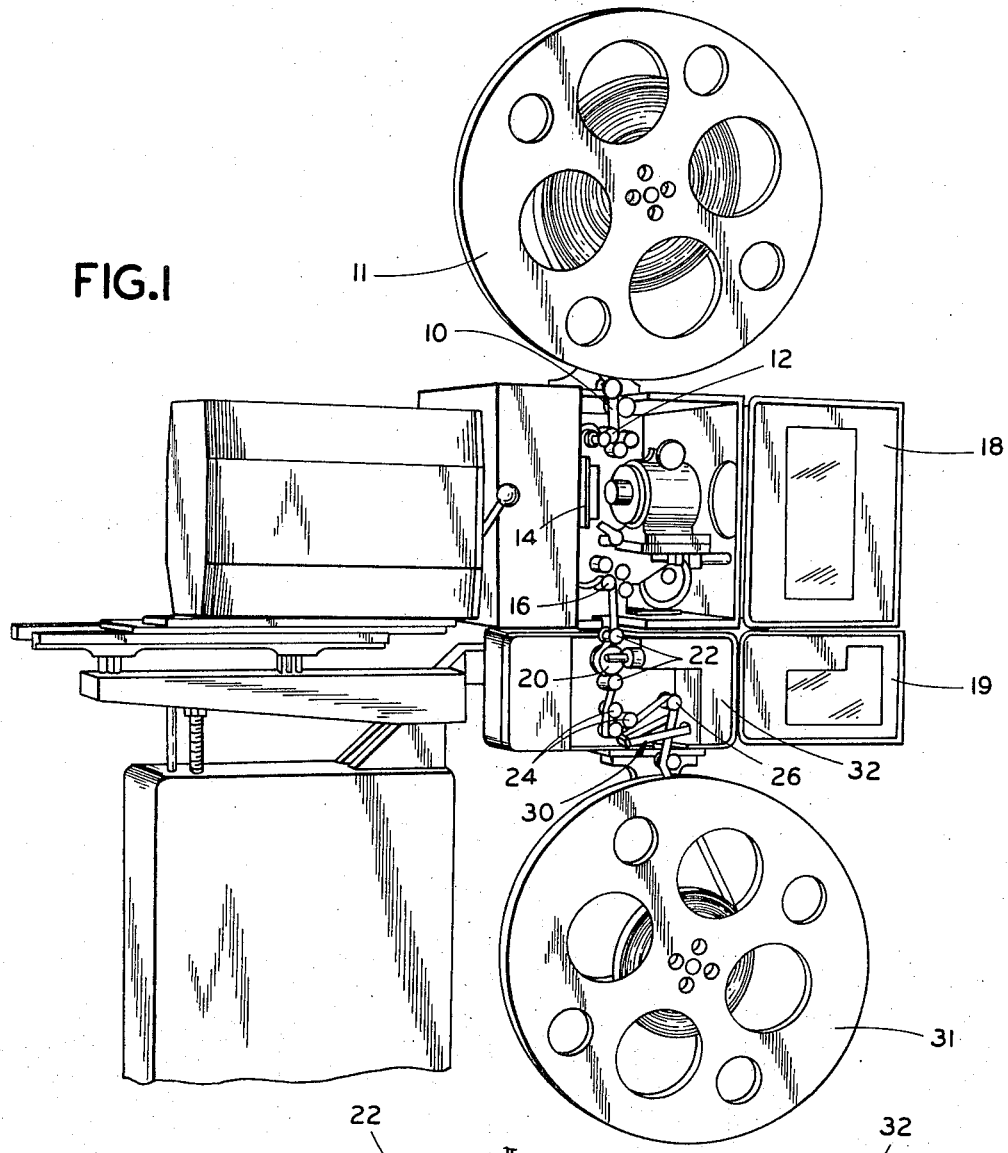
FIG. 1 is a perspective view of a motion picture projector incorporating the run-out and safety switch of the present invention.

FIG. 1 of the drawings shows a typical motion picture projector into which the protection switching mechanism of the present invention may be incorporated. A motion picture filmstrip 10 from a supply reel 11 is fed downward through an upper drive sprocket 12, aperture plates 14, and an intermediate drive sprocket 16, all of which are housed within a projectiong chamber which, during operation, is covered by the windowed door 18.

Figure 2:
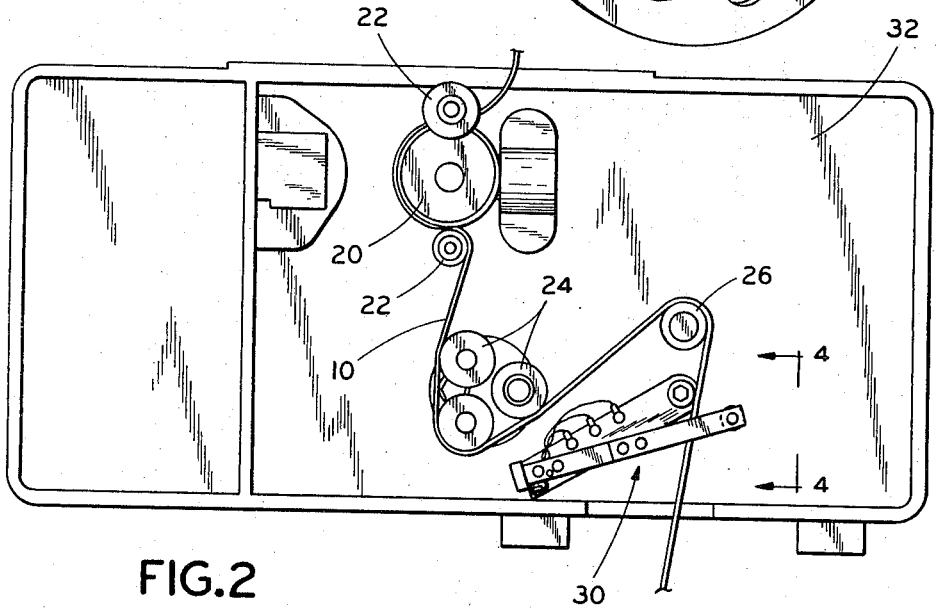
FIG. 2 is a side elevational view of the sound head chamber of the projector in which the protection switch embodying the principles of the invention is mounted.

The filmstrip 10 travels downwardly from the intermediate drive sprocket 16 into a sound head chamber covered during operation by the windowed door 19 and shown in enlarged detail in the side elevational view of FIG. 2. Filmstrip 10 passes adjacent the sound head 20 and is held in proper registration with the sound head by means of the guide rollers 22. A pair of spring-loaded tension rollers 24 maintains the appropriate tension on the filmstrip 10 as it travels between the intermediate drive sprocket 16 (shown in FIG. 1) and the lower drive sprocket 26 (shown in both FIGS. 1 and 2).

A safety switch may be associated with one of the tension rollers 24 such that, should the film break or should either inadequate or excessive tension on the filmstrip exist, the projector may be automatically shut down. When the film splits, however, such a tension roller is incapable of sensing the difficulty. A split filmstrip condition is sensed, however, by the run-out and safety protection switching mechanism which is shown generally at 30 in FIGS. 1 and 2, and which embodies the principles of the present invention. The protection mechanism 30 is positioned at a detection station between the lower drive sprocket 26 and the take-up reel 31.

Figure 3:
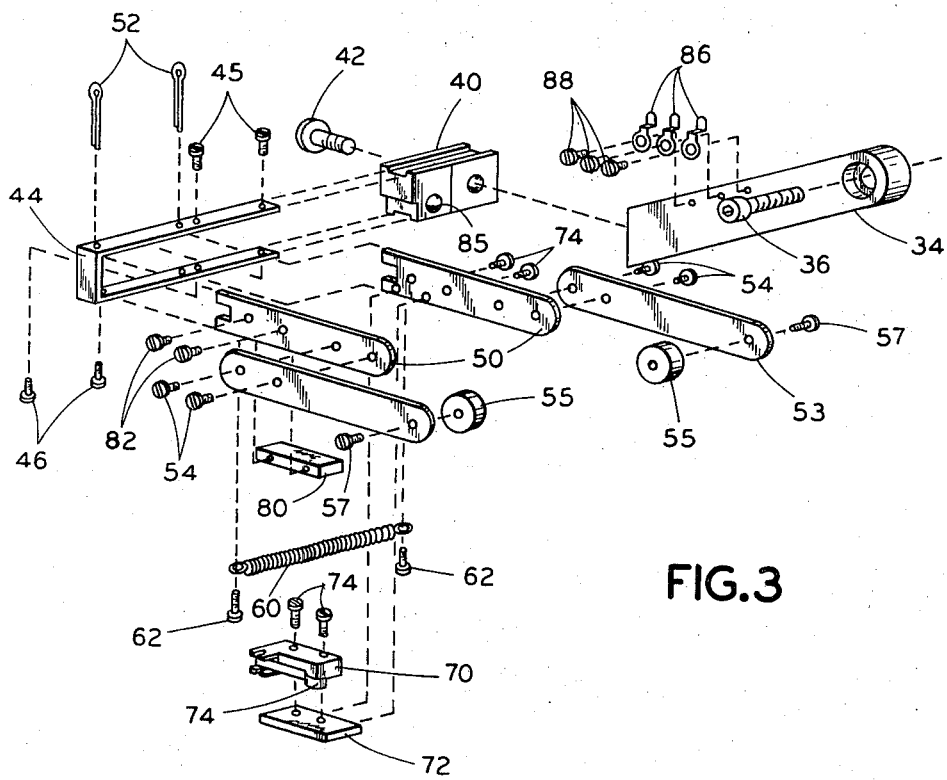
FIG. 3 is an exploded, perspective drawing of the run-out and safety switch assembly.

The details of the construction of this improved switching mechanism 30 are shown in the exploded, perspective view of FIG. 3. The switching mechanism 30 is mounted in fixed relation to the interior wall 32 of the sound head chamber (as seen in FIGS. 1 and 2) by means of a bakelite mounting block 34 which is held in place by a mounting bolt 36. An aluminum mounting block 40 is attached to the opposite end of the bakelite block 34 by a bolt 42. A channel is machined into both the upper and lower surfaces of the mounting block 40 to receive the bifurcated ends of a U-shaped mounting bracket 44. The upper flange of the bracket 44 is affixed to the block 40 by screws 45 while the lower flange is affixed to the block 40 by screws 46.

A pair of aluminum swing arms 50 are attached to the bracket 44 by means of pivot pins 52. A pair of steel swing arm extension members 53 are attached to the ends of the aluminum swing arms 50 by the screws 54. At the extreme end of each swing arm extension 53, a filmstrip retaining button 55 is attached to the inner surface of each extension 53 by a screw 57. A tension spring 60 is attached to its ends at the underside of the swing arm 50 by the screws 62.

A limit switch 70 is attached by means of a mounting bracket 72 and the screws 74 to the inner surface of the interior swing arm 50. The limit switch 70 is provided with a movable armature 74, the outer, curved end of which bears against a block 80 which is fastened to the inner surface of the outer swing arm 50 by a pair of screws 82.

The switched electrical conductors from limit switch 70 (not shown) are passed through the circular guide hole 85 bored through block 40 and connected to the terminal lugs 86 which are mounted on the bakelite mounting block 34 by means of the terminal screws 88. Three terminals are provided to accommodate connections to the single-pole, double-throw switch 70, allowing the switching assembly 30 to be used with either normally opened or normally closed circuits in the projector.

Figures 4, 5:
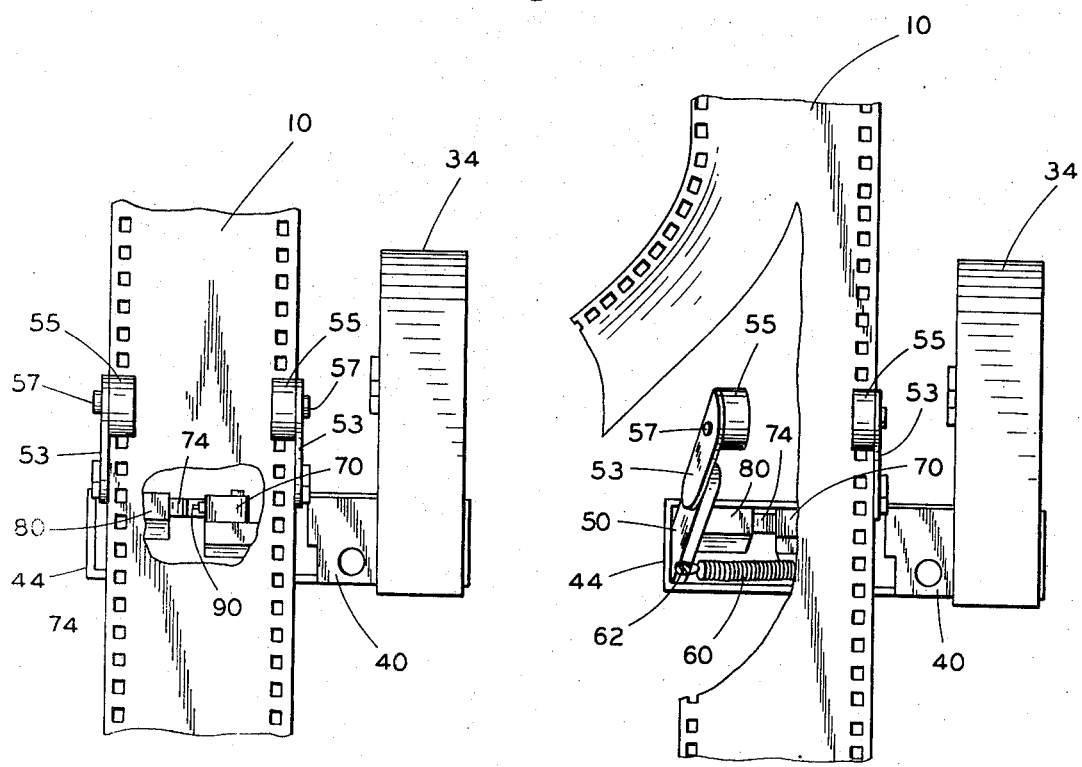
FIG. 4 is an end view of the protection switch assembly taken from the position 4—4 shown in FIG. 3.
FIG. 5 is an end view of the protection switch assembly showing the position of the switch arms under a split film condition.

A portion of the filmstrip 10 is cut away in FIG. 4 of the drawings to show the manner in which the switch 70 is activated. The moving armature 74 of the switch 70 is positioned to bear against the surface of block 80. Should either side of the filmstrip 10 split off, or should the filmstrip 10 break entirely, the two arm extensions 53 are allowed to move toward one another, causing the switch 70 and the block 80 to move together, until the moving armature 74 depresses the switch activating plunger 90 (see in FIG. 4) in the limit switch 70.

FIG. 5 of the drawings shows the manner in which the switching mechanism 30 is activated when one side of the filmstrip splits off. As will be apparent, a similar action takes place in the event the other side of the filmstrip should break off.

The two sensing arms pivot about pins 52 which are separated by a distance substantially equal to the normal width of filmstrip 10. In this way, the pivot arms 50 and extensions 53 are substantially parallel when held separated by the filmstrip 10, permitting the filmstrip 10 to move laterally without actuating the switch 70.

The protection switching mechanism 30 which has been described is preferably positioned at a detection station near the take-up reel 31 for two reasons. First, since film splitting or breakage might take place anywhere within the sprocket and guide system of the projector's filmstrip transport assembly, it is desirable to place the protection switch at the end of the filmstrip's travel through this assembly. Secondly, should breakage occur, it is desirable to continue operation of the projector drive until the "tail" of the filmstrip has been pulled clear of the hot aperture plates 14.

It should be understood that the run-out and safety switch assembly which has been described is merely illustrative of one application of the principles of the invention. Numerous modifications may be made by those skilled in the art without departing from the true spirit and scope of the invention.

What is claimed is:

1. In a motion picture projector, the combination comprising:
    sprocket and guide means for advancing a filmstrip from a supply reel to a take-up reel,
    first and second spaced-apart swing arms mounted for pivotal motion about first and second axes respectively, said axes being spaced apart by distance approximately equal to the width of said filmstrip,
    spring means urging the extended ends of said swing arms toward one another and into sliding engagement with the outer edges of said advancing filmstrip, and
    electrical switching means mounted on one of said arms for actuation by the approach of the other of said arms to de-energize said sprocket and guide means whenever the absence of any portion of said filmstrip allows the spacing between said arms to decrease below a predetermined limit.

2. The combination as set forth in claim 1 wherein each of said swing arms extends beyond the normal position of said filmstrip and wherein said arms are provided at their extremities with opposing retaining members which extend toward one another whereby said filmstrip is retained in a captured position between said arms.

3. A protected motion picture filmstrip transport mechanism comprising, in combination:
    a supply reel having a length of motion picture filmstrip wound thereon,
    a series of motor-driven sprockets for transporting said filmstrip,
    a take-up reel for receiving said filmstrip from said sprockets, and
    a safety switch for shutting down the operation of said motor-driven sprockets in response to the breaking or splitting of said filmstrip, said safety switch comprising, in combination:
    first and second spaced-apart swing arms mounted for pivotal motion about first and second axes respectively, said axes being spaced apart by distance approximately equal to the width of said filmstrip,
    spring means urging the extended ends of said swing arms toward one another and into sliding engagement with the outer edges of said advancing filmstrip, and
    electrical switching means mounted on one of said arms for actuation by the approach of the other of said arms to de-energize said motor-driven sprockets whenever the absence of any portion of said filmstrip allows the spacing between said arms to decrease below a predetermined limit.

* * * * *